US012645680B1

(12) United States Patent
Phifer et al.

(10) Patent No.: US 12,645,680 B1
(45) Date of Patent: Jun. 2, 2026

(54) EVENT TRACKING SYSTEMS AND METHODS

(71) Applicant: Scipco LLC, Boca Raton, FL (US)

(72) Inventors: Jackson Phifer, New York, NY (US); Nicholas Anewalt, New York, NY (US); Cole Rubin, Boca Raton, FL (US)

(73) Assignee: Scipco LLC, Boca Raton, FL (US)

( * ) Notice: Subject to any disclaimer, the term of this patent is extended or adjusted under 35 U.S.C. 154(b) by 0 days.

(21) Appl. No.: 19/208,317

(22) Filed: May 14, 2025

Related U.S. Application Data

(60) Provisional application No. 63/727,760, filed on Dec. 4, 2024.

(51) Int. Cl.
*G06F 16/24* (2019.01)
*G06F 16/2457* (2019.01)
(52) U.S. Cl.
CPC .............................. *G06F 16/24575* (2019.01)
(58) Field of Classification Search
CPC ......... G06F 16/24575; G06F 16/24578; G06F 16/24573
See application file for complete search history.

(56) References Cited

U.S. PATENT DOCUMENTS

| | | | | |
|---|---|---|---|---|
| 12,002,010 | B2 * | 6/2024 | Toudji | ................ G06Q 10/1093 |
| 2009/0156182 | A1 * | 6/2009 | Jenkins | .............. G06Q 30/0251 |
| | | | | 455/414.2 |
| 2014/0304262 | A1 | 10/2014 | Makki | |
| 2016/0352846 | A9 | 12/2016 | Gauglitz | |
| 2017/0180961 | A1 | 6/2017 | Gauglitz | |
| 2017/0372616 | A1 | 12/2017 | Del Vecchio | |
| 2019/0259052 | A1 * | 8/2019 | Glasson | ............. H04N 21/4784 |
| 2021/0124723 | A1 | 4/2021 | Barthel | |
| 2025/0029287 | A1 * | 1/2025 | Edwards | ................ G06F 40/40 |

* cited by examiner

*Primary Examiner* — Loc Tran
(74) *Attorney, Agent, or Firm* — David R. Stevens; Stevens Law Group

(57) ABSTRACT

Systems and methods for event tracking are disclosed. In one aspect, a set of venues is generated. A set of events that have occurred at one or more venues in the set of venues may be generated. One aspect includes querying a user media database associated with a user, and extracting metadata from one or more media files in the user media database. A match between at least a portion of the metadata and one or more events from the set of events may be determined. In an aspect, responsive to the determining, an entry in a matched events database corresponding to the match is created. A list of events attended by the user may be prepared. The list of events may include the matched events.

16 Claims, 17 Drawing Sheets

200

202  GENERATE A SET OF VENUES

204  GENERATE A SET OF EVENTS

206  QUERY A USER MEDIA DATABASE

208  ITERATE THROUGH THE USER MEDIA DATABASE

210  PROCESS MEDIA METADATA

212  MATCH FOUND?  NO  YES

214  CREATE EVENT ENTRY IN DATABASE

216  METADATA PROCESSING COMPLETE?  NO  YES

218  SEND USER A LIST OF MATCHED EVENTS

402 — CALCULATE A PHYSICAL DISTANCE BETWEEN A LOCATION OF EACH VENUE ASSOCIATED WITH EACH EVENT AND MEDIA LOCATION INFORMATION IN METADATA

404 — DETERMINE A CLOSEST VENUE TO THE MEDIA LOCATION

406 — DETERMINE A TEMPORALLY CLOSEST EVENT WITHIN A PREDETERMINED TIME RANGE

408 — CATEGORIZE THE TEMPORALLY CLOSEST EVENT AS A MATCHING EVENT

500

600

700

800

900

1000

1100

1200

1300

10:20

Your Event History Recap

Cole's Event Recap
Powered by StatClub

153
Total Events ⚙

| | |
|---|---|
| Total Venues | 54 |
| Busiest Year | 2022 |
| Top Season | Winter |

◆ Sports
136 attended

Top League
NFL

Top Team
Miami Heat

🎤 Concerts
25 attended

Top Genre
Rock

Top Artist
Dave Matthews
Band

Include my event history
Allow others to view your events (not photos)

Photos          Messages          Instagram          More

Skip

1400

1500

1600

1700

EVENT TRACKING SYSTEMS AND METHODS

BACKGROUND

This application claims the priority benefit of provisional patent application No. 63/727,760 titled "Event Tracking Systems and Methods" filed on Dec. 4, 2024, the disclosure of which is incorporated by reference herein in its entirety.

TECHNICAL FIELD

The present disclosure relates to systems and methods configured to generate a set of events attended by a user, based on processing metadata embedded in one or more media files captured by a user mobile device when the user has attended the events. This set of events can be viewed by the user to experience a memory or memories at the one or more events in the set of events.

BACKGROUND ART

Current mobile devices such as mobile phones, laptop computers, wearable devices, and tablets include image and video capturing devices such as cameras. Images and video (also referred to herein collectively as "media" or "media files") captured by a camera mobile device are typically stored in a database on the mobile device (e.g., a camera roll). These media files can be further annotated with data/metadata (e.g., EXIF) that includes exposure information, date and time, image capture device information, and global positioning system (GPS)-enabled location. This data/metadata can be extracted from the images and video and used, for example, to determine when and where an image was captured.

SUMMARY

Aspects of the invention are directed to systems and methods for preparing a list or set of one or more events that a user has attended in the past. One aspect includes generating a set of venues. A set of events that have occurred at one or more venues in the set of venues may also be generated. Metadata may be extracted from one or more media files in a user media database that is queried to access the media files. In one aspect, a match is determined between at least a portion of the metadata and one or more events from the set of events. Responsive to the determining, an entry may be created in a matched events database corresponding to the match. A list of events attended by the user may be prepared. In one aspect, the list of events includes the matched events.

Other aspects include computer systems and/or apparatuses that implement the above method.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
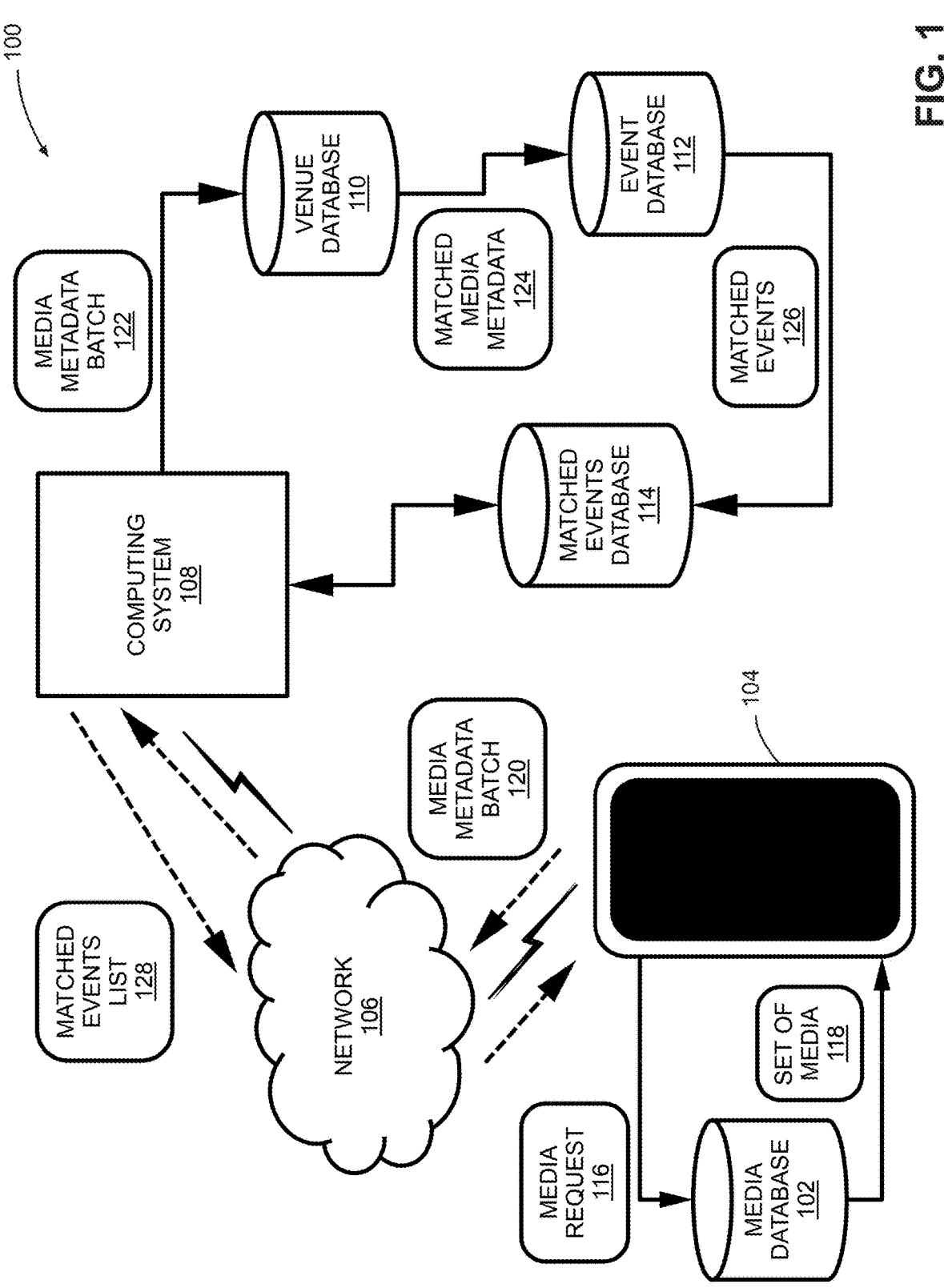
FIG. 1 is a block diagram depicting a computer architecture of an event tracking system.

In the following description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random-access memory (RAM) device, a read-only memory (ROM) device, an erasable programmable read-only memory (EPROM or Flash memory) device, a portable compact disc read-only memory (CDROM), an optical storage device, a magnetic storage device, and any other storage medium now known or hereafter discovered. Computer program code for carrying out operations of the present disclosure may be written in any combination of one or more programming languages. Such code may be compiled from source code to computer-readable assembly language or machine code suitable for the device or computer on which the code can be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider inter-action and then scaled accordingly. A cloud model can be composed of various characteristics (e.g., on-demand self-service, broad network access, resource pooling, rapid elas-ticity, and measured service), service models (e.g., Software as a Service ("SaaS"), Platform as a Service ("PaaS"), and Infrastructure as a Service ("IaaS")), and deployment mod-els (e.g., private cloud, community cloud, public cloud, and hybrid cloud).

The flow diagrams and block diagrams in the attached figures illustrate the architecture, functionality, and opera-tion of possible implementations of systems, methods, and computer program products according to various embodi-ments of the present disclosure. In this regard, each block in the flow diagrams or block diagrams may represent a module, segment, or portion of code, which includes one or more executable instructions for implementing the specified logical function(s). It is also noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufac-ture including instruction means which implement the func-tion/act specified in the flow diagram and/or block diagram block or blocks.

Mobile device owners oftentimes use their mobile devices to capture images and video (referred to herein as "media" or "media files") of and/or at an event that they attend. Examples of such events include concerts, movies, theater events, sports events, recreational events (golf, fishing, etc.), and dining experiences. The images and videos captured at these events generally include embedded data such as EXIF data/metadata. This data/metadata is used by the systems and methods described herein, to generate a list of events attended by a mobile device user based on data/metadata extracted from an image database associated with the mobile device. The list of events can be provided to the user as a set of memories. The user can relive an experience of attending the events by viewing the memories. Based on the list of events, future events of potential interest to the user can be recommended to the user.

FIG. 1 is a block diagram depicting a computer architec-ture of an event tracking system 100. As depicted, event tracking system 100 includes media database 102, user mobile device 104, network 106, remote computing system 108, venue database 110, event database 112, and matched events database 114.

In an aspect, user mobile device 104 is configured to communicate with remote computing system 108 via net-work 106. Network 106 may be a public network (e.g., the Internet), or a private network. User mobile device 104 may be carried by a user to different events (e.g., concerts, movies and sports events). The user may use user mobile device 104 to capture media and generate media files comprising one or more images and/or video during an event. This media may be stored to media database 102, included in the user mobile device 104. Alternatively, media databased 102 may be a database on a remote server such as a cloud server.

In one aspect, user mobile device 104 is a portable/mobile computing system/platform such as a mobile phone, a tablet, a laptop computer, and so on. The systems and methods described herein can also be implemented using a user computing device such as a desktop computer (not depicted in FIG. 1) that may be used in conjunction with or in place of user mobile device 104. As will be generally understood, the user mobile device 104 is a user computing system that includes at least one processor, a memory, and a network interface.

In an aspect, the media stored on media database 102 may also include embedded data/metadata related to exposure information, date and time, media capture device informa-tion, and GPS-enabled location. In an aspect, remote com-puting system 108 may be implemented as a remote server (e.g., a cloud-based computing system or a cloud-based server). Remote computing system 108 may communicate with user mobile device 104 and the user via, for example, an application software (app) running on user mobile device 104. The application software running on user mobile device 104 may be configured to communicate with computing system 108 via network 106.

In one aspect, user mobile device 104 periodically initi-ates a media request 116 to media database 102 (e.g., when the user opens the app running on user mobile device 104). Media database 102 (e.g., a camera roll) may respond with an output that includes a complete set of media 118 (e.g., an entire camera roll). User mobile device 104 may extract metadata from each media file from the media database 102. In an aspect, user mobile device 104 creates one or more media metadata batches from all the metadata, and transmits the metadata batches 120 to remote computing system 108, via network 106.

Separately, remote computing system 108 may generate a set of venues associated with one or more events, and a set of events. The set of venues may be stored in venue database 110. In an aspect, venue database is a PostGis database. The set of events may be stored in event database 112. Remote computing system 108 may iterate through (e.g., query) the media metadata batch 120 from user mobile device 104 as media metadata batch 122, to find a match between a location in metadata included in metadata batch 122, asso-ciated with one or more media files sourced from media database 102, and one or more venues stored on venue database 110. For each matched venue from venue database 110 (represented as matched media metadata 124), remote computing system 108 attempts to determine an event that is within a certain timeframe (e.g., +/−6 hours) of a metadata timestamp associated with a media file, by querying event database 112. In an aspect, matched media metadata 124 is within a designated radius of a venue.

If an event is found, an event identifier is returned as a matching event (i.e., matched event(s) 126), and an entry is created and stored in matched events database 114. Once remote computing system 108 has completed processing all the metadata from the media files in media database 102, remote computing system 108 transmits a complete list of events attended (stored in matched events database 114) to user mobile device 104 as matched events list 128, via network 106. The remote computing system 108 processes media files in batches via the metadata batches 120 and 122. In one aspect, the remote computing system 108 sends a response back to the user mobile device 104 after each batch is fully processed, rather than waiting for all batches to be processed before sending a single response. The associated application software running on user mobile device 104 handles reconciliation and aggregation of these responses. The user can view this list of events attended via the associated application software, on user media device 104.

Figure 2:
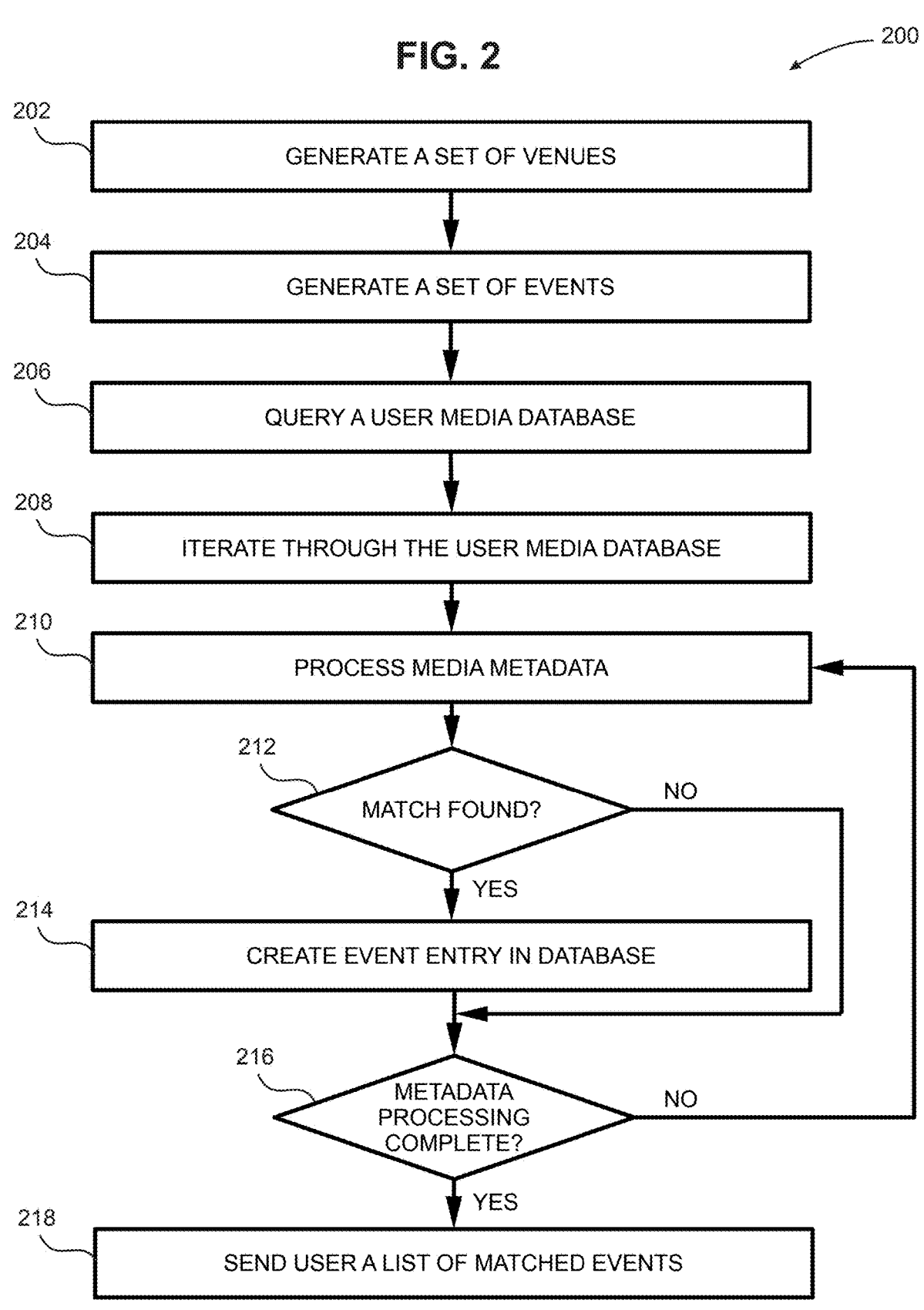
FIG. 2 is a flow diagram depicting a method to transmit a list of matched events to a user.

FIG. 2 is a flow diagram depicting a method 200 to transmit a list of matched events to a user. In one aspect, method 200 includes generating a set of venues (202). For example, remote computing system 108 may generate a set of venues, $V_p$, where each venue $v \in V_p$ contains at least the following information:

A venue identifier (ID) $i_v$

A latitude $\alpha_v$ associated with the venue

A longitude $o_v$ associated with the venue

An altitude $h_v$ associated with the venue

A radius $r_v$ associated with the venue

In one aspect, the set of venues $V_p$ is stored in venue database 110. Radius $r_v$ may be measured in meters. Radius $r_v$ may be used as a limiting boundary distance from an associated venue.

At 204, method 200 generates a set of events. For example, remote computing system 108 may generate a set of events, $E_p$, where each event $e \in E_p$ contains (at least) the following information:

An event identifier (ID) $i_e$

An ISO-8601-format date string $t_e$

A venue identifier (ID) $k_e$, associated with the event and separate from the venue identifier $i_v$ In an aspect, the date string $t_e$ is in a coordinated universal time (UTC) format. The venue identifier $k_e$ is used to identify a venue that an event $i_e$ is being held at. In one aspect, the set of events $E_p$ is stored in event database 112.

In one aspect, method 200 includes an application running on user mobile device 104 being allowed full access, by the user, to media database 102 (e.g., a camera roll) (206). For example, remote computing system 108 may query the entire media database 102, including the following metadata:

A media timestamp $t_m$ associated with each media file

A media location, that further includes:

A latitude $\alpha_m$

A longitude $o_m$

An altitude $h_m$

In one aspect, latitude am, longitude $o_m$ and altitude $h_m$ are embedded in the media metadata based on data from an onboard GPS unit associated with user mobile device 104.

In one aspect, method 200 includes iterating the user's media database 102 (208). For example, remote computing system 108 may iterate through a camera roll associated with user mobile device 104. The camera roll may include one or more media files. Remote computing system 108 may iterate through the media files in batches of 1000 media files. In other embodiments, the batch number may be different from 1000 media files. This iteration process may include the following operations:

Media metadata, M, is sent from user mobile device 104 to remote computing system 108 (e.g., as media metadata batch 120).

Data transferred to remote computing device 108 from user mobile device 104 may be limited to media metadata only, with no media files being transmitted from user mobile device 104 to remote computing device 108. The actual media files may remain on user mobile device 104 (i.e., and/or media database 102).

Requests to remote computing system 108 may be sent in parallel.

Requests may include metadata batches containing embedded media metadata (e.g. EXIF, geolocation, timestamp data).

The client side (i.e., user mobile device 104) may transmit requests as quickly as it can process the media files stored in media database 102.

In one aspect, during 208, an application software running on user mobile device 104 extracts metadata from the media files stored in media database 102, and transmits this metadata to remote computing system 108, (e.g., as media metadata batch 120).

Method 200 may process metadata from the media files stored in media database 102 (210). For each media metadata m E M in media metadata batch 120 received by remote computing system 108, method 200 performs the following operations at 210:

$\forall v \in V_p$, find a distance (e.g., in meters) between the venue and metadata as $d_v = H(\alpha_v, o_v, h_v, \alpha_m, o_m, h_m)$, where H is the haversine function.

Find a closest venue to the media file, $v_c$, that does not exceed the venue's radius $V_r = \{v \in V_p | d_v \leq r_v\}$ $d_c = \min\{d_r \in V_r\}$ $v_c = v | d_v = d_c$ If no venue is found, return nothing Let the set of events at this venue be $E_c = \{e \in E | k_e = i_{v_c}\}$ $\forall e \in E_c$, find the earliest event, $e_m$ that is within a certain time range (e.g., 6 hours) of the metadata timestamp.

$t_e \geq t_m - 6$ hours $t_e \leq t_m + 6$ hours $t_n = \min \{t_e \in E_c\}$ $e_m = e | t_e = t_n$ Return $e_m$ as the matching event At 212, method 200 checks to determine whether a match was found. If a match was found, method 200 creates/adds an event entry in the database (214). The entry:

Includes all relevant metadata

Includes a relation to the event that was flagged

In an aspect, the event entry is added to matched events database 114. The event then goes to 216.

On the other hand, if, at 212, no match was found, then method 200 goes directly to 216, where method 200 checks to determine whether metadata processing for all media files is complete. If metadata processing is not complete, then the method returns to 210. If the metadata processing is complete, then method 200 goes to 218, where the method sends the user a complete list of (matched) events attended by the user. The list may include:

Media, to include photos and/or video corresponding to the matched metadata

Event information, to include:

Date

Performers/teams

Customized information, such as:

Set list (if the event is a concert)

Box score (if the event is a sports game)

In one aspect, the event matching algorithm (e.g., method 200) can also utilize the contents of the media itself to match to a specific venue or a specific event (e.g., based on media stored in media database 102). This media matching algorithm can be used independently of the metadata or in conjunction with the metadata. If the media is matched against a specific venue, the timestamp (included in the media metadata) will need to be used to find the Event at the matched venue at that specific time. If media is matched against a specific event (using specific text, performer+ venue uniqueness, etc.), no media metadata will be used to determine a match. In one aspect, media metadata is used to validate the match.

The media analysis and subsequent matching is done using the following technique. An image is run through an initial segmentation layer to identify key attributes/features to be later analyzed. These attributes/features include people, text, advertisements, and key landmarks (stage, field, etc.). These key attributes/features are embedded and used to match against known key attributes/features from a curated database of performers, teams, and stadium landmarks. This process works differently for the two different types of media (i.e., an image versus a video). For an individual image, the image itself is analyzed. For a video, one frame/second is pulled to then be analyzed. All matches above a certain similarity score are included. Conflicts are resolved on the venue attribute by comparing the most common match within a venue.

Figure 3:
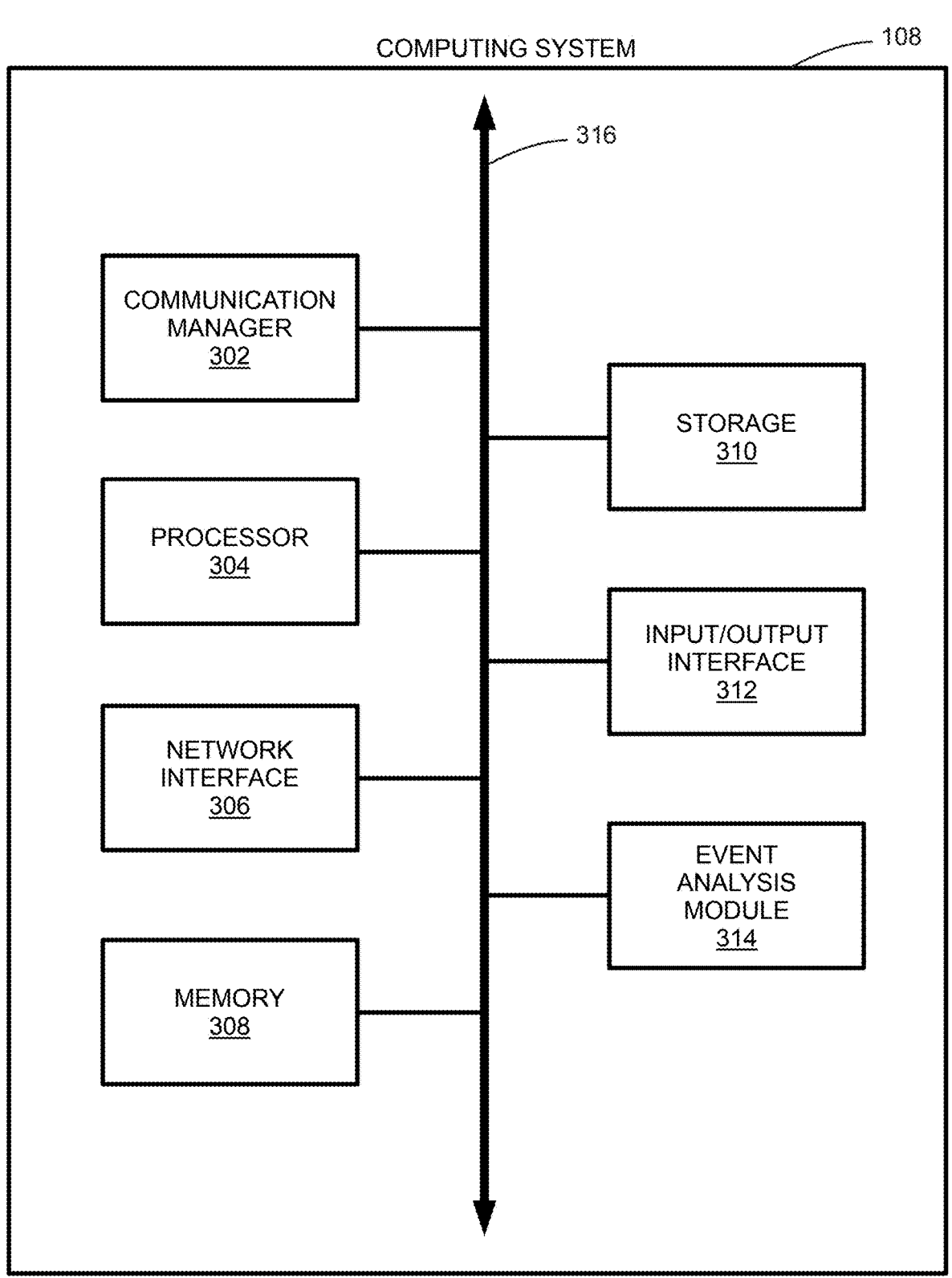
FIG. 3 is a block diagram depicting a computing system.

FIG. 3 is a block diagram depicting computing system 108. As depicted, computing system 108 includes communication manager 302, processor 304, network interface 306, memory 308, storage 310, input/output interface 312, event analysis module 314, and system bus 320.

In an aspect, communication manager 302 is configured to manage communication protocols and associated communication with external peripheral devices as well as communication with other components in computing system 108. For example, communication manager 302 may be responsible for generating and maintaining respective communication interfaces between computing system 108 and user mobile device 104.

A processor 304 included in some embodiments of computing system 108 is configured to perform functions that may include generalized processing functions, arithmetic functions, and so on. Processor 304 is configured to process information associated with the systems and methods described herein. Processor 304 may be configured as any combination of microcontrollers, microprocessors, digital signal processors (DSPs), field-programmable gate arrays (FPGAs), graphics processing units (GPUs), accelerated processing units (APUs), central processing units (CPUs), application-specific integrated circuits (ASICs), and so on. Processor 304 may be embodied as a single-core processor, or a multi-core processor. Processor 304 may be implemented as a centralized processor, or in a distributed manner (e.g., a distributed computing system).

Network interface 306 may be used to interface computing system 108 with other computing devices and/or computer networks (e.g., interfacing computing system 108 with network 106). Examples of computer networks include a local area network (LAN), a wide area network (WAN), the Internet, and so on. Network interface 306 may support any combination of wired and wireless connectivity/communication protocols such as Ethernet, Wi-Fi, Bluetooth, ZigBee, etc.

In an aspect, memory 308 includes a non-transitory computer medium. Memory 308 may be comprised of any combination of volatile and non-volatile memory components. Examples of components that may be used to implement memory 308 include random-access memory (RAM), read-only memory (ROM), electrically-erasable programmable read-only memory (EEPROM), flash memory, magnetic memory, optical memory, and so on. Memory 308 may include machine-readable instructions that may be executable by a processor such as processor 304. These machine-readable instructions when executed by the processor 304 cause the processor 304 to perform one or more method steps of an embodiment described herein.

Computing system 108 may include storage 310, that further includes one or more long-term storage devices such as hard disk drives, magnetic drives, magnetic tape, optical storage media (e.g., compact disks (CDs) or digital versatile disks (DVDs)), and so on. Storage 310 may be implemented as a non-transitory computer-readable medium. Storage 310 may be configured to store data and/or instructions related to the operation of computing system 108.

Input/output interface 312 allows other devices or a user to interact with embodiments of the systems described herein. Input/output interface 312 may include any combination of user interface devices such as a keyboard, a mouse, a trackball, one or more visual display monitors, touch screens, incandescent lamps, LED lamps, audio speakers, buzzers, microphones, push buttons, toggle switches, and so on. Input/output interface 312 may alco include interfaces such as USB, Thunderbolt and FireWire that enable computing system 108 to interface with different devices.

Event analysis module 314 may be configured to implement, for example, one or more portions of method 200. Event analysis module 314 may, for example, query media database 102 (206), iterate through the media database 102 (208), and process media metadata batch 120 (210), along with other stages of method 200.

System bus 316 communicatively couples the different components of computing system 108, and allows data and communication messages to be exchanged between these different components.

Figure 4:
FIG. 4 is a flow diagram depicting a method to categorize a temporally closest event as a matching event.
Figure 4:
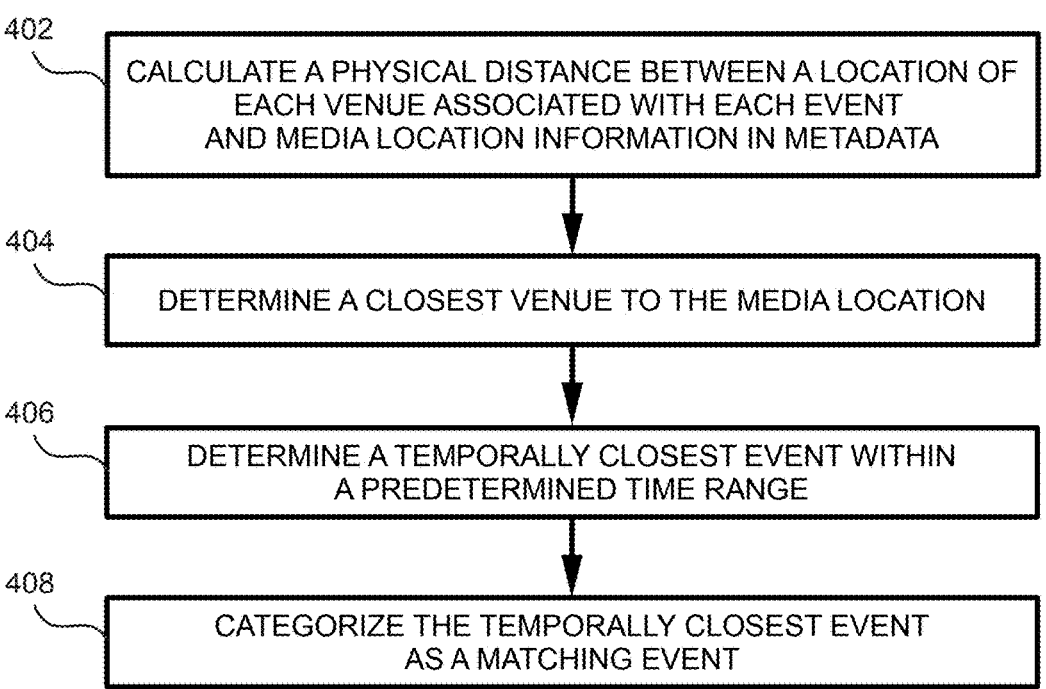

FIG. 4 is a flow diagram depicting a method 400 to categorize a temporally closest event as a matching event. Method 400 may be used to implement stage 212 of method 200.

Method 400 may include calculating a physical distance between a location of each venue associated with each event and media location information in metadata received from user mobile device 104 (402). For example, computing system 108 may calculate, for each venue location stored in venue database 110, a physical distance between the venue location and media location information in media metadata batch 120/122. 402 may be performed for metadata in media metadata batch 120 that is associated with each media file in media database 102.

Method 400 may include determining a closest venue to the media location (404). For example, computing system 108 may determine a closest venue from venue database 110, based on the media location information, for a given (or each) media file.

Method 400 may include determining a temporally closest event within a predetermined time range (406). For example, computing system 108 may determine a temporally closest event to the closest venue from event database 112, for the media file. The temporally closest event may be associated with the closest venue. In one aspect, the temporal closeness is determined based on a predetermined time range (e.g., +/−6 hours from a timestamp associated with the media location information in metadata of the media file as included in media metadata batch 120).

Method 400 may include categorizing the temporally closest event as a matching event (408). For example, computing system 108 may categorize the temporally closest event to the location in the media file metadata as a matching event, and store the matching event information in matched events database 114, as a part of matched events 126.

Other features of event tracking system 100 include:

Remote computing system 108 may be configured to maintain an exhaustive list of ticketed events from a past time period (e.g., 10 years, or 20 years) to match against.

Coverage may include:

Sports

Movies

Musicals

Musical/music performances

Plays

Concerts, to further include

All ticketed items from databases such as Vivid

Remote computing system 108 may be updated daily with new event data

An initial creation of the list of ticketed items may be based on an initial larger historical ingestion New events may be automatically added to the new event list on an ongoing basis The application software running on user mobile device 104 may upload a complete event history stored on user mobile device 104 to remote computing system 108.

Remote computing system 108 may be configured to use this event history to serve specific updates about current and/or future events related to future bands and/or sports teams that may be visiting cities near the user (event recommendation)

Remote computing system 108 may be configured to augment the event history with custom information from each event, such as:

Custom information:

Set list for concerts

Box score for events

Remote computing system 108 uses the event history to create detailed statistics about the user's event history, such as:

Listening statistics

Most common songs seen

Most common cover seen

Sports statistics

Win/loss records for favorite team

For baseball, total homeruns seen

The event tracking system 100 may be configured to allow the user to share the event history with other users The user may be able to upload images and event information to the remote computing system 108 (e.g., a remote server). These images and event information can then be directly shared with other users.

FIGS. 5-17 are screenshots depicting user interfaces associated with the systems and methods described herein. These user interfaces may be presented as graphical user interfaces to a user of user mobile device 104 to enable the user to interact with event tracking system 100. The user interfaces may be interactive, accepting user inputs via touch-sensitive, voice recognition, or other inputs on user mobile device 104.

Figure 5:
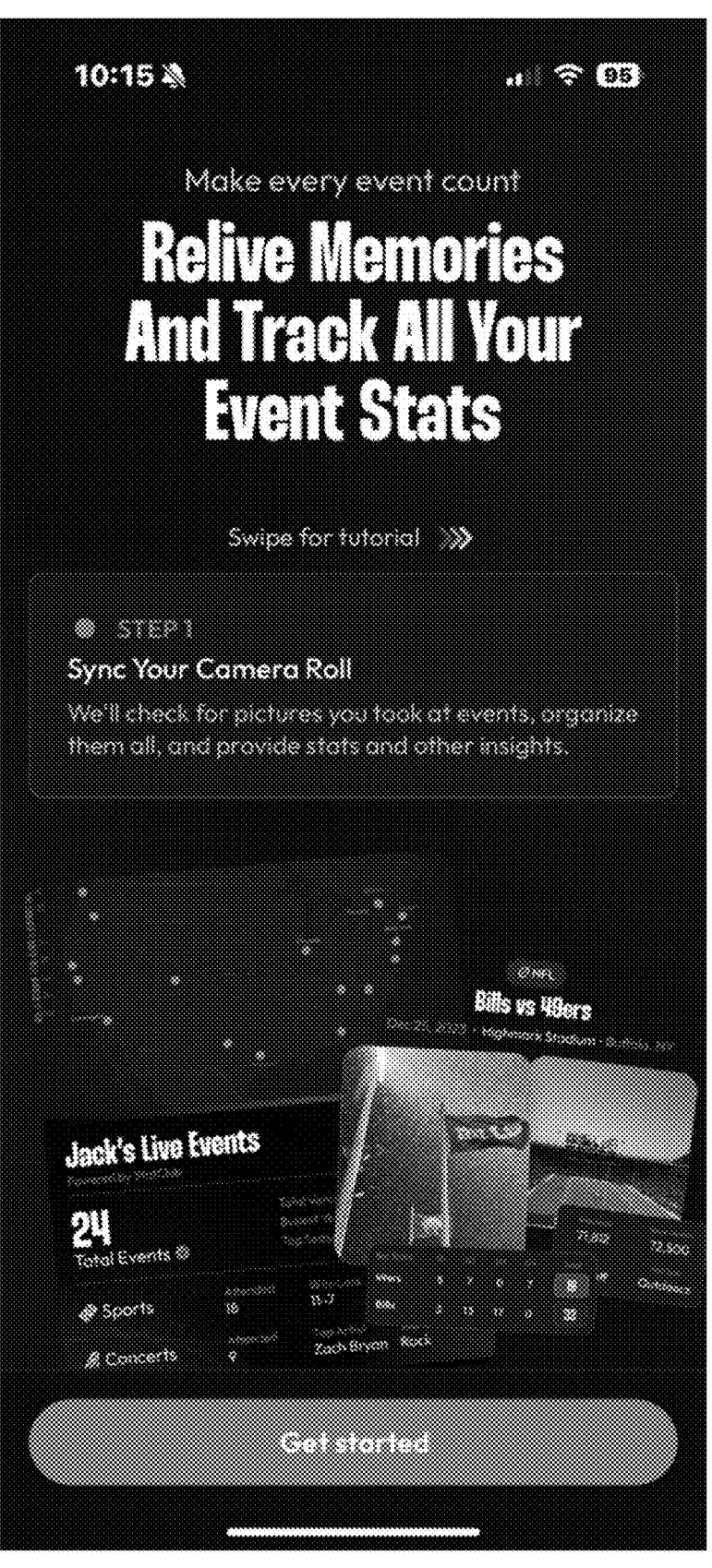
FIGS. 5-17 are screenshots depicting user interfaces associated with the systems and methods described herein.

FIG. 5 is a screenshot 500 depicting a welcome screen interface 500 displayed to the user. As depicted, welcome screen interface 500 displays a welcome message, along with a first step that advises the user to sync their camera roll.

Figure 6:
Figure 6:

FIG. 6 is a screenshot depicting a user login/registration screen 600 that allows the user to log in to an existing account or create a new user account.

Figure 7:
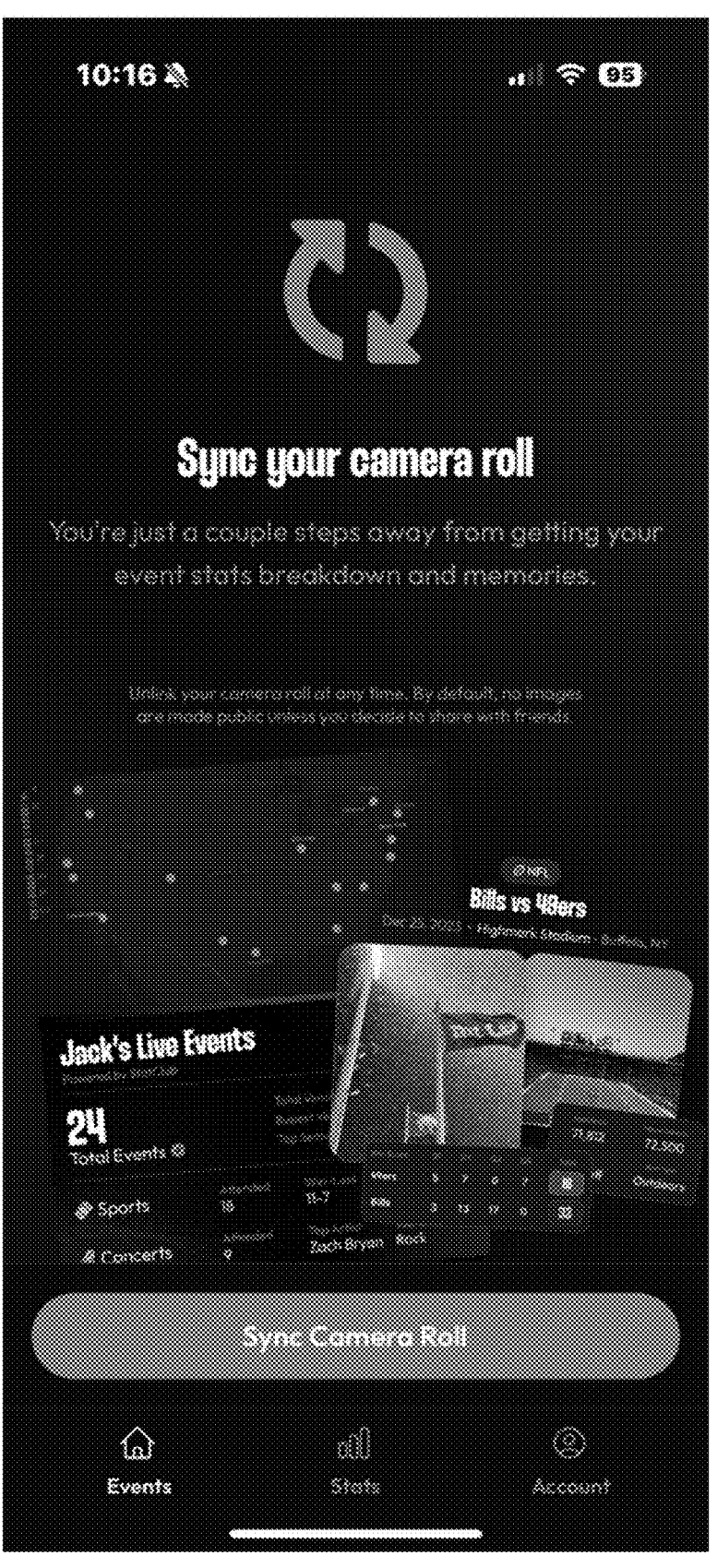

FIG. 7 is a screenshot depicting a user interface 700 post-user login, providing the user an option to sync their camera roll.

Figure 8:
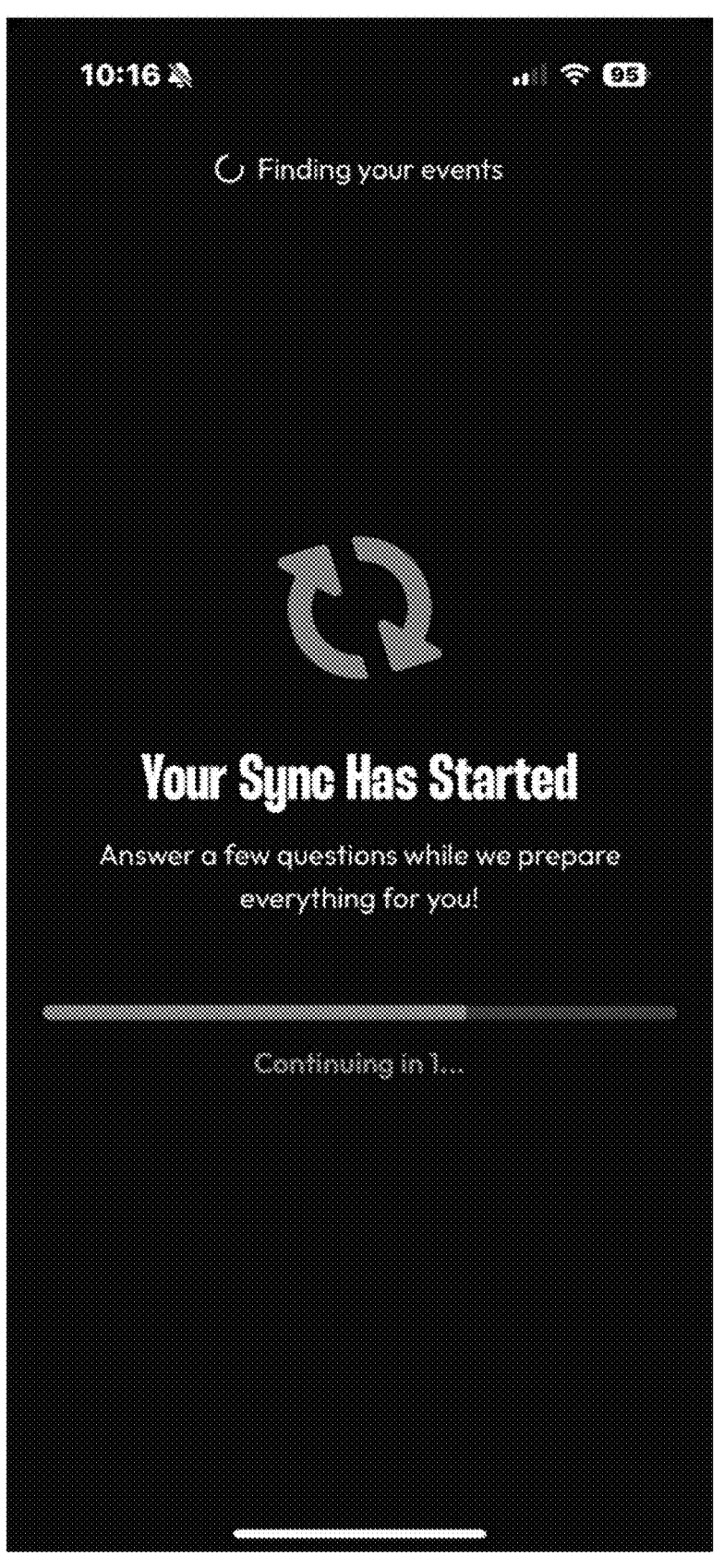

FIG. 8 is a screenshot depicting an interface 800 showing a sync in process. If the user selects the option to sync their camera roll on the interface 700, the user interface presents interface 800 that displays a progress of the sync. Interface 800 may advise the user to answer one or more questions while the sync in process. The user-provided answers are used to provide an enhanced user experience.

Figure 9:
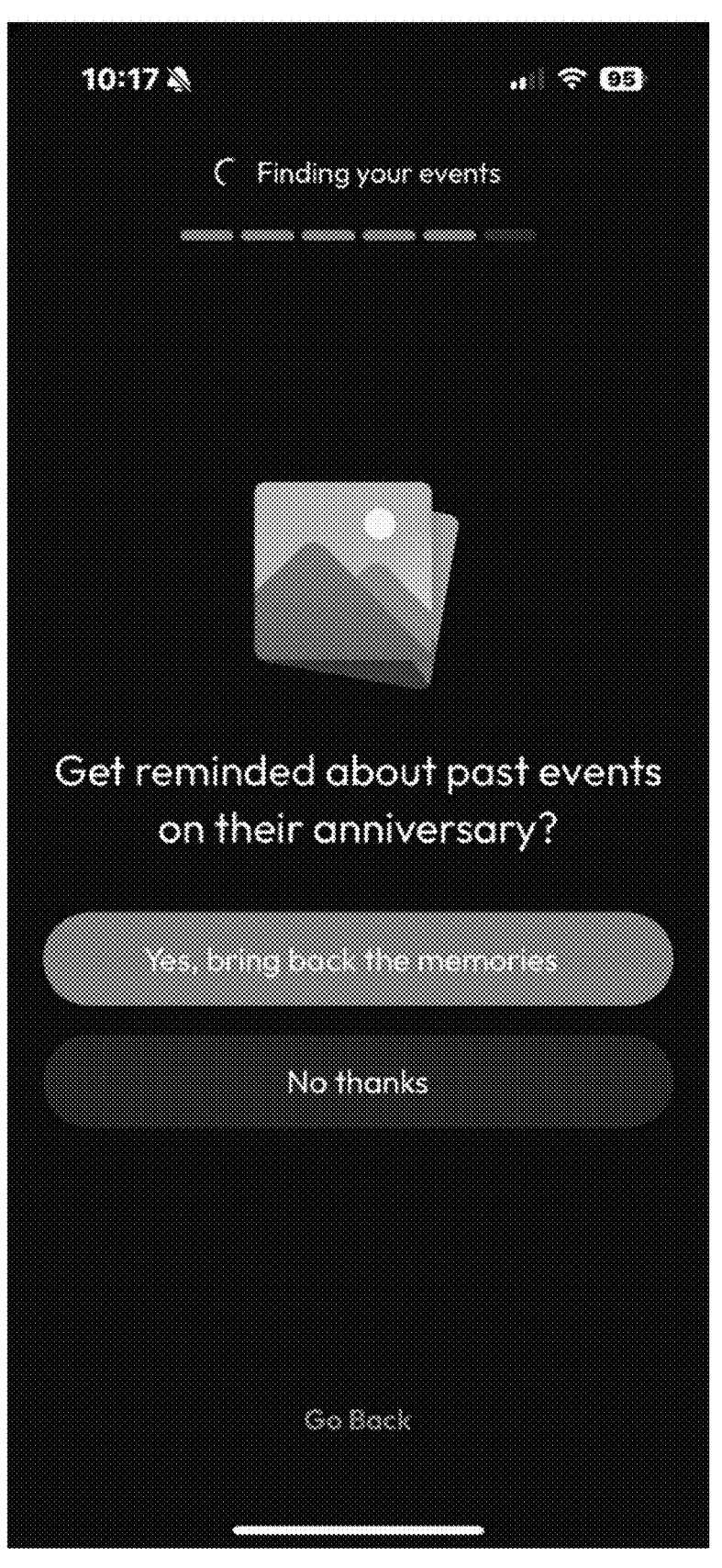

FIG. 9 is a screenshot depicting a user interface 900 that presents a question of the one or more questions for the user.

Figure 10:
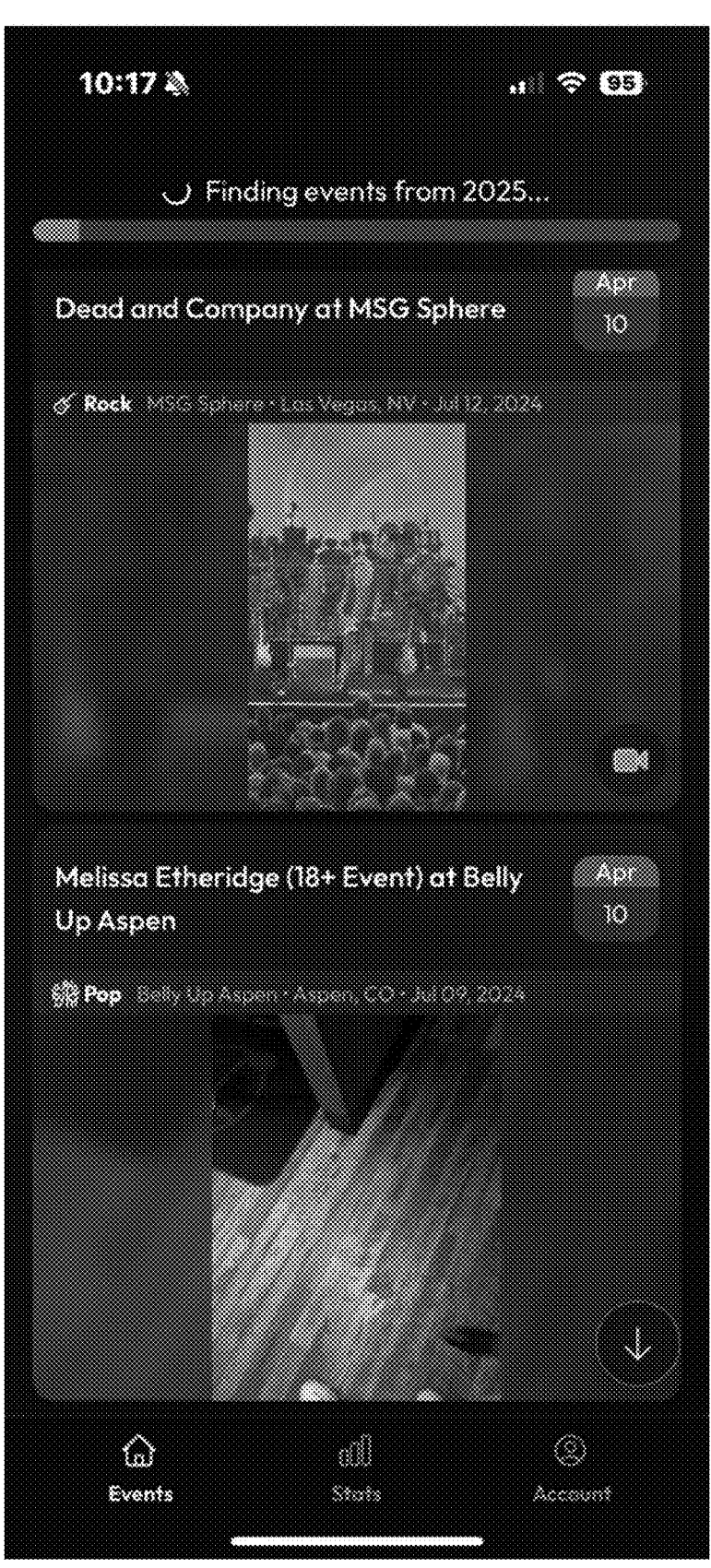

FIG. 10 is a screenshot depicting a user interface 1000 that presents one or more events (media and textual information) to the user from a specific year (in this case, 2025). User interface 1000 also depicts the event tracking system 100 finding events from 2025 (e.g., processing media metadata batch 120).

Figure 11:
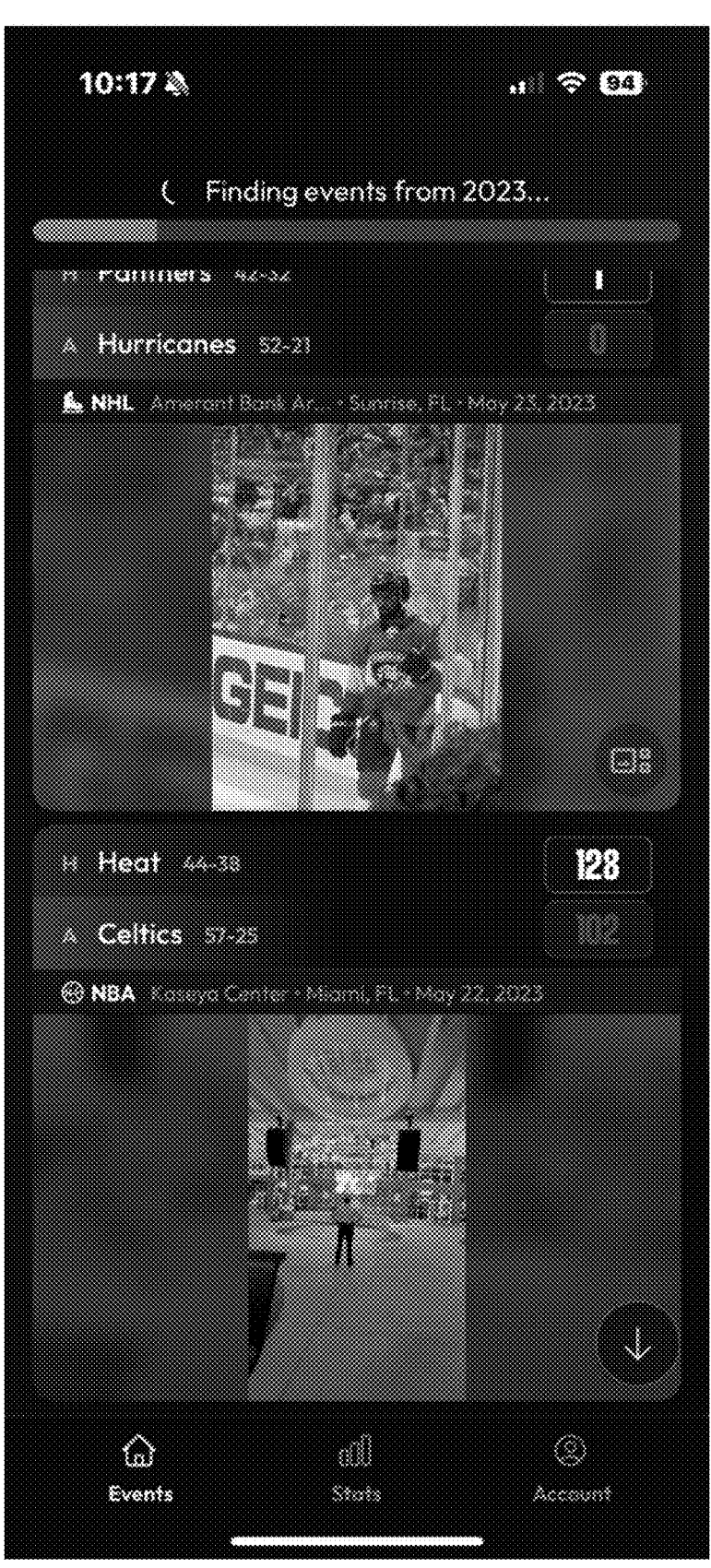

FIG. 11 is a screenshot depicting a user interface 1100 that presents one or more events (media and textual information) to the user from a specific year (in this case, 2023). User interface 1100 also depicts the event tracking system 100 finding events from 2023 (e.g., processing media metadata batch 120).

Figure 12:
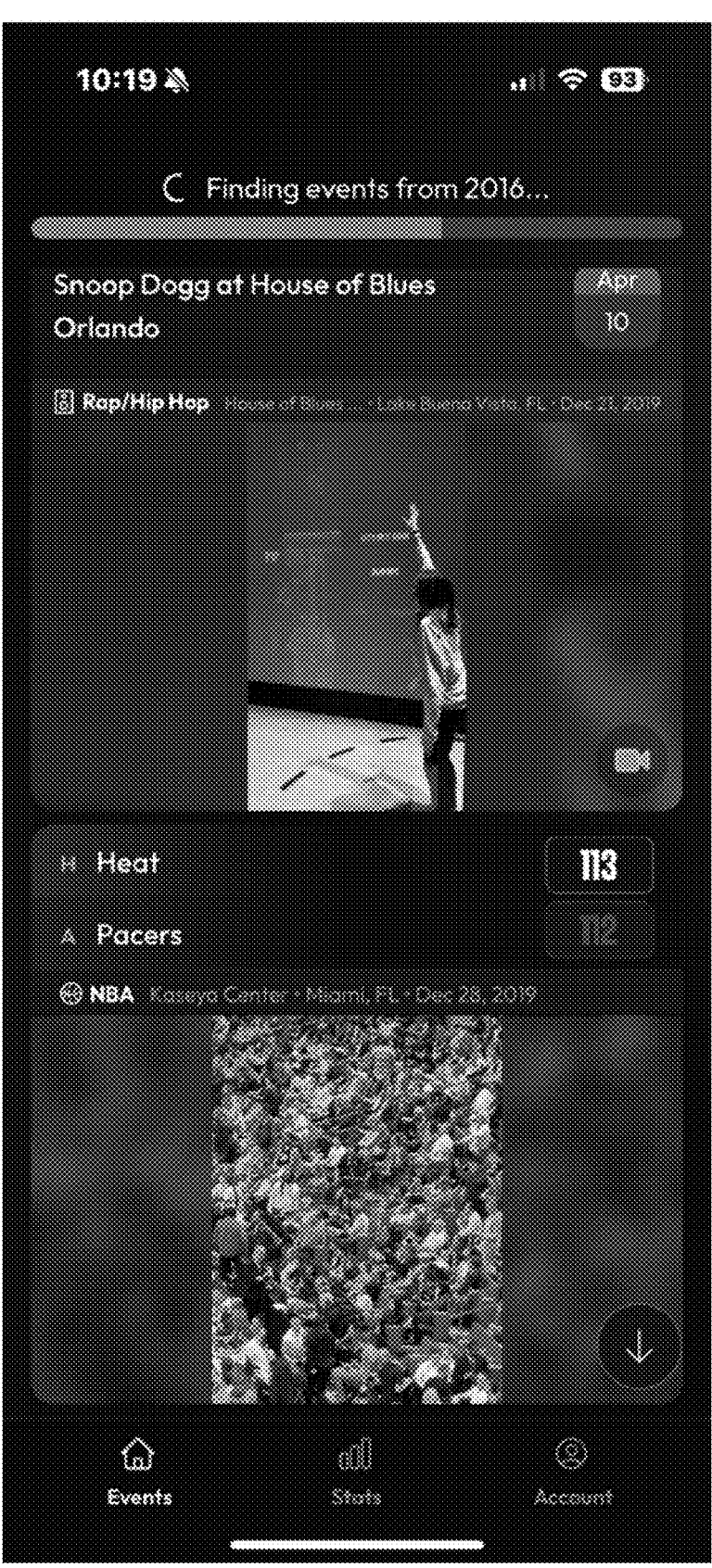

FIG. 12 is a screenshot depicting a user interface 1200 that presents one or more events (media and textual information) to the user from a specific year (in this case, 2016). User interface 1200 also depicts the event tracking system 100 finding events from 2016 (e.g., processing media metadata batch 120).

Figure 13:
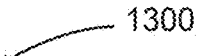

FIG. 13 is a screenshot depicting a user interface 1300 that provides a summary of the user's event history. User interface 1300 may include insights and statistics. For example, the event history may include a total number of events attended, a total number of venues attended, a busiest year, a top season, and other categories as shown in user interface 1300. The user may also have an option to allow other users to view the matched events.

Figure 14:

FIG. 14 is a screenshot depicting a user interface 1400 that provides an overview of the user's events. In FIG. 14, the user interface 1400 presents sports events, along with one or more images captured at those events.

Figure 15:
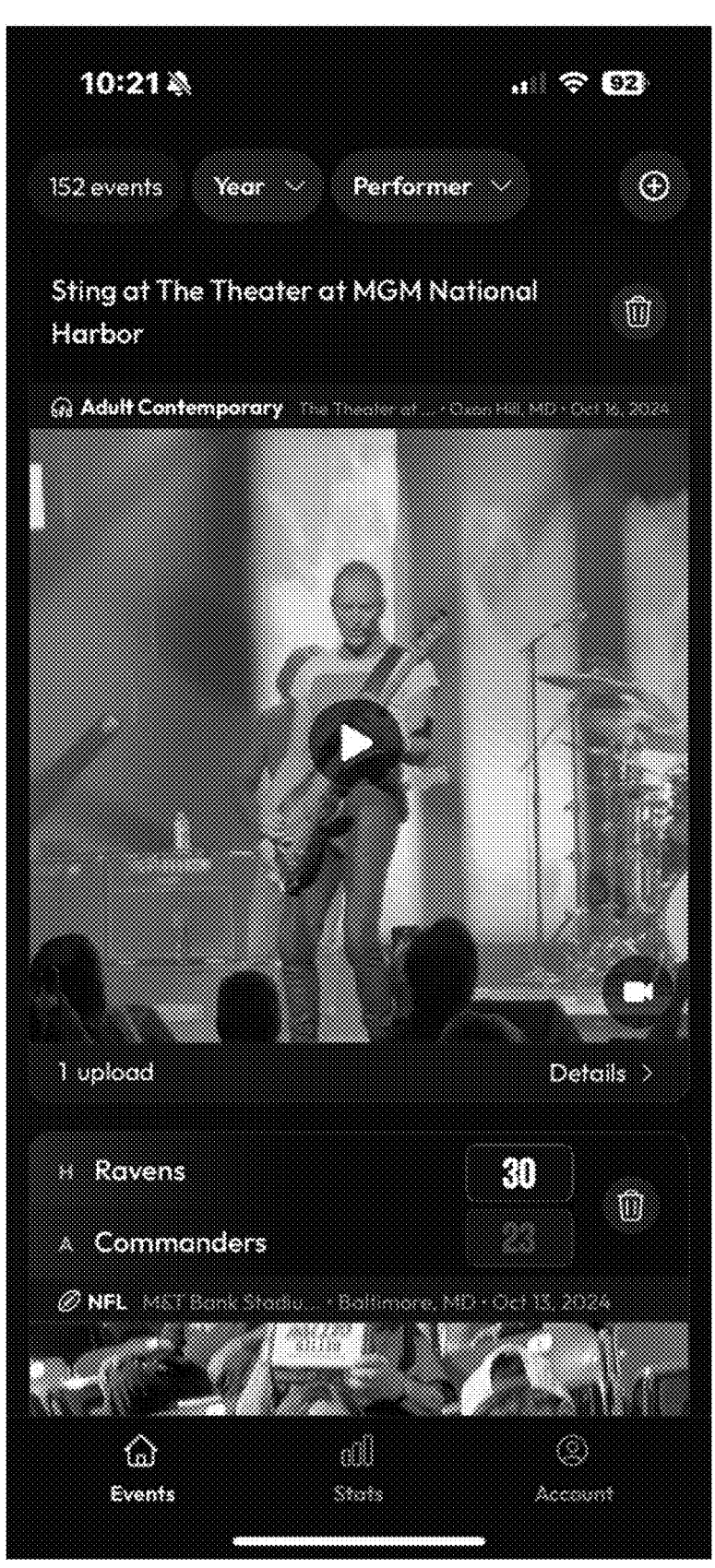

FIG. 15 is a screenshot depicting a user interface 1500 that provides an overview of the user's events. In FIG. 15, the user interface 1500 presents music and sports events, along with one or more images captured at those events.

Figure 16:

FIG. 16 is a screenshot depicting a user interface 1600 that provides an overview of the user's events. In FIG. 16, the user interface 1600 presents a sporting event, along with one or more images captured at that event.

Figure 17:
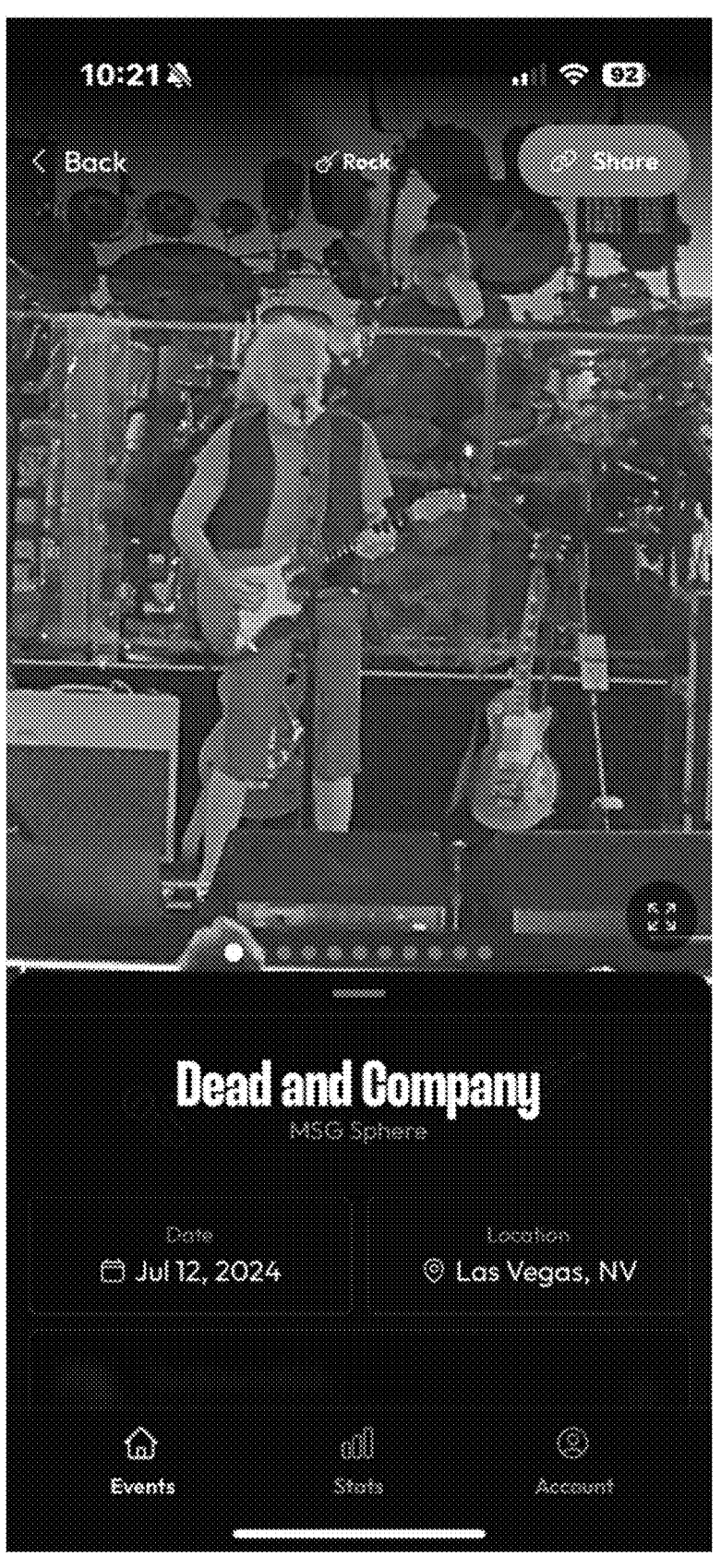

FIG. 17 is a screenshot depicting a user interface 1700 that provides an overview of the user's events. In FIG. 17, the user interface 1700 presents a musical event, along with one or more images captured at that event.

In an aspect, the user interfaces 1400 through 1700 may be linked via continuous scrolling operations. For example, starting at user interface 1400, a user may be able to scroll (e.g., by swiping or by using other touchscreen-related gestures), through user interfaces 1500, 1600, 1700 and beyond, if additional events are available.

Although the present disclosure is described in terms of certain example embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method comprising:
generating a set of venues, wherein the set of venues includes, for each venue:
   a venue identifier;
   a latitude, a longitude and an altitude associated with the venue; and
   a radius associated with the venue, wherein the radius is used to determine a limiting boundary distance from the venue, and wherein the radius is compared with a user position in the metadata to determine if the user was present at the venue at a time that a specific event was being held at the venue;
generating a set of events that have occurred at one or more venues in the set of venues;
querying a user media database associated with a user;
extracting metadata from one or more media files in the user media database;
determining a match between at least a portion of the metadata and one or more events from the set of events, wherein the determining further comprises, for each media file in the user media database:
   calculating a physical distance between a location of each venue in a venue database and media location information associated with the media file, wherein the media location information is included in the metadata;
   determining a physically closest venue to the media location based on the calculating;
   determining a temporally closest event from a subset of the set of events that is within a predetermined time range of a metadata associated with the media file, wherein the subset includes one or more events that are associated with the physically closest venue; and
   categorizing the temporally closest event as a matching event;
responsive to the determining, creating an entry in a matched events database corresponding to the match; and
preparing a list of events attended by the user, wherein the list of events includes the matched events.

2. The method of claim 1, further comprising transmitting the list of events to the user.

3. The method of claim 2, further comprising transmitting the list of events to one or more user-authorized contacts.

4. The method of claim 1, wherein the metadata includes, for each media file:
   a timestamp corresponding to a generation of the media file; and
   a media location that further includes a latitude, a longitude and an altitude associated with a location where the media was generated.

5. The method of claim 1, wherein the predetermined time range is within +/−6 hours of a timing of each of the one or more events associated with the physically closest venue.

6. The method of claim 1, wherein the list includes any combination of a date, a list of one or more performers or teams, and a set list, a box score, or a scorecard.

7. The method of claim 1, wherein a media file of the one or more media files is any of a still image or a video as captured by an image capturing device associated with a user mobile device.

8. The method of claim 1, wherein the metadata is EXIF data.

9. An apparatus comprising:
a user mobile device including an image capturing device, comprising a computing processor, the image capturing device, configured to capture one or more media files and store the media files to a user media database associated with the user mobile device; and
a computing system, comprising a computing processor, communicatively coupled to the user mobile device, wherein the computing system being configured to:
generate a set of venues, wherein the set of venues includes, for each venue:
   a venue identifier;
   a latitude, a longitude and an altitude associated with the venue; and
   a radius associated with the venue, wherein the radius is used to determine a limiting boundary distance from the venue, and wherein the radius is compared with a user position in the metadata to determine if the user was present at the venue at a time that a specific event was being held at the venue;
generate a set of events that have occurred at one or more venues in the set of venues;
query the user media database;
extract metadata from the one or more media files;
determine a match between at least a portion of the metadata and one or more events from the set of events, wherein the determining further comprises, for each media file in the user media database:
   calculating a physical distance between a location of each venue in a venue database and media location information associated with the media file, wherein the media location information is included in the metadata;
   determining a physically closest venue to the media location based on the calculating;
   determining a temporally closest event from a subset of the set of events that is within a predetermined time range of a metadata associated with the media file, wherein the subset includes one or more events that are associated with the physically closest venue; and
   categorizing the temporally closest event as a matching event;
responsive to the determining, create an entry in a matched events database corresponding to the match; and
prepare a list of events attended by the user, wherein the list of events includes the matched events.

10. The apparatus of claim 9, wherein the computing system transmits the list of events to the user.

11. The apparatus of claim 10, wherein the computing system transmits the list of events to one or more user-authorized contacts.

12. The apparatus of claim 9, wherein the metadata includes, for each media file:
   a timestamp corresponding to a generation of the media file; and
   a media location that further includes a latitude, a longitude and an altitude associated with a location where the media was generated.

13. The apparatus of claim 9, wherein the predetermined time range is within +/−6 hours of a timing of each of the one or more events associated with the physically closest venue.

14. The apparatus of claim 9, wherein the list includes any combination of a date, a list of one or more performers or teams, and a set list, a box score, or a scorecard.

15. The apparatus of claim 9, wherein a media file of the one or more media files is any of a still image or a video as captured by the image capturing device.

16. The apparatus of claim 9, wherein the metadata is EXIF data.

\* \* \* \* \*